Oct. 11, 1966     A. O. KLEIN ET AL     3,277,674
BURNER-INLET VALVE FOR GAS LIGHTERS
Original Filed March 29, 1963
4 Sheets-Sheet 2
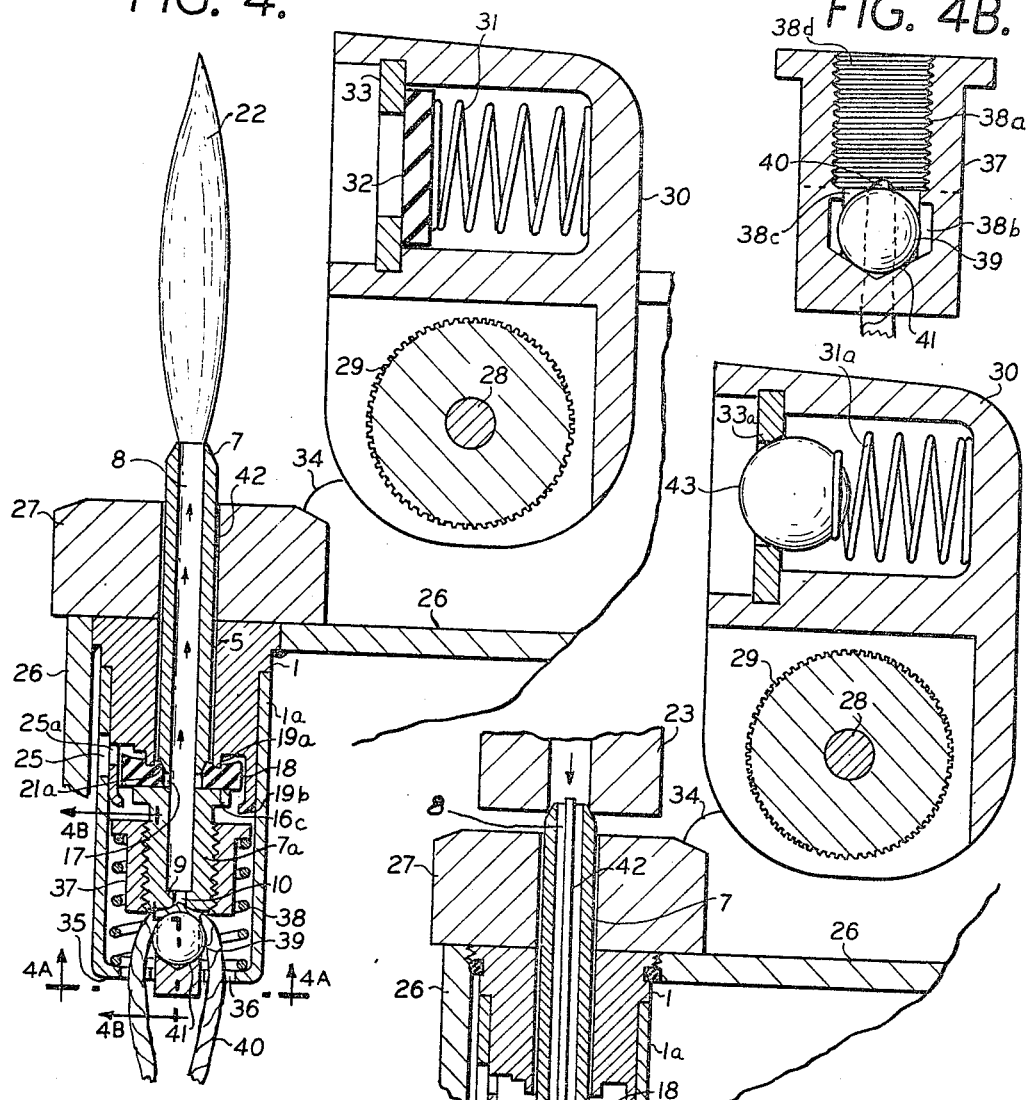
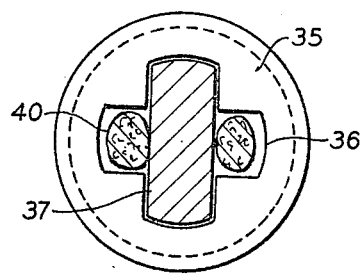
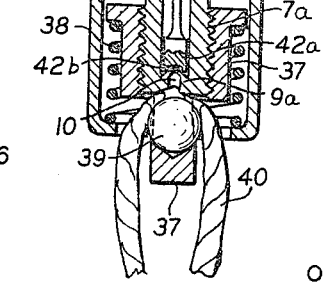
INVENTORS
ARTHUR O. KLEIN
JAMES D. SMITH
BY *Arthur O. Klein*
ON BEHALF OF HIMSELF AND
AS ATTORNEY FOR
JAMES D. SMITH

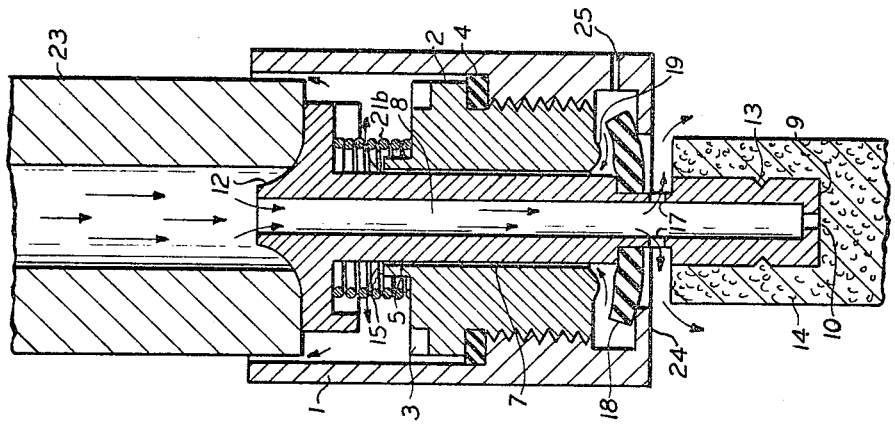
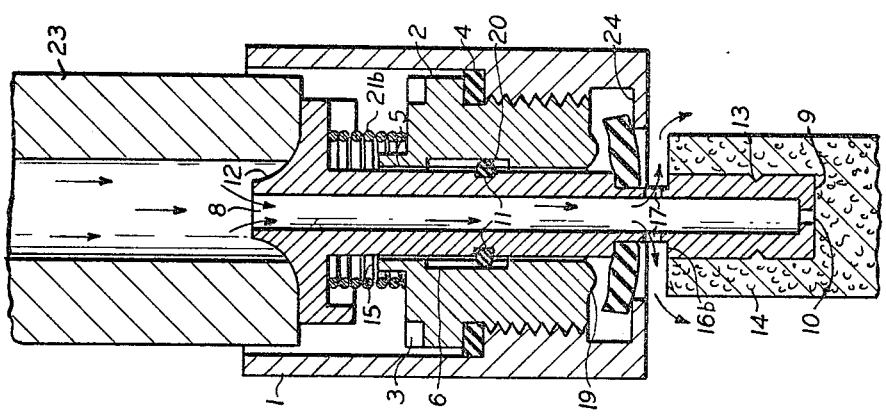
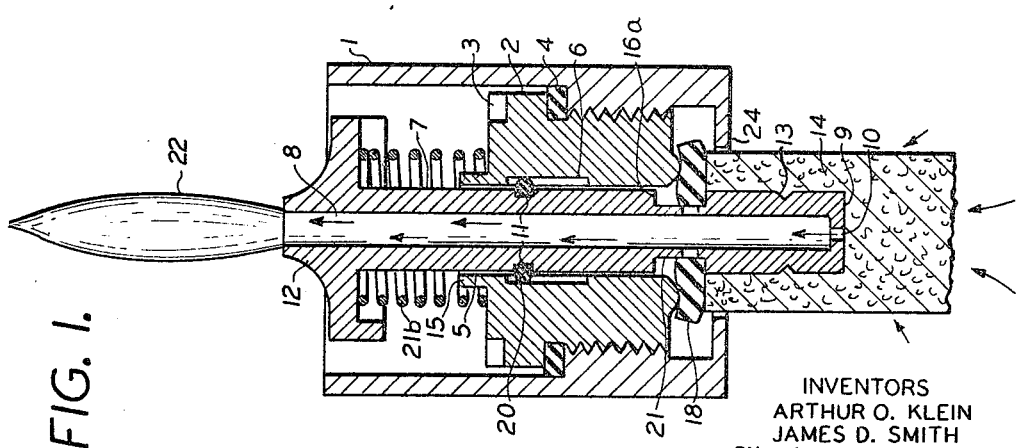

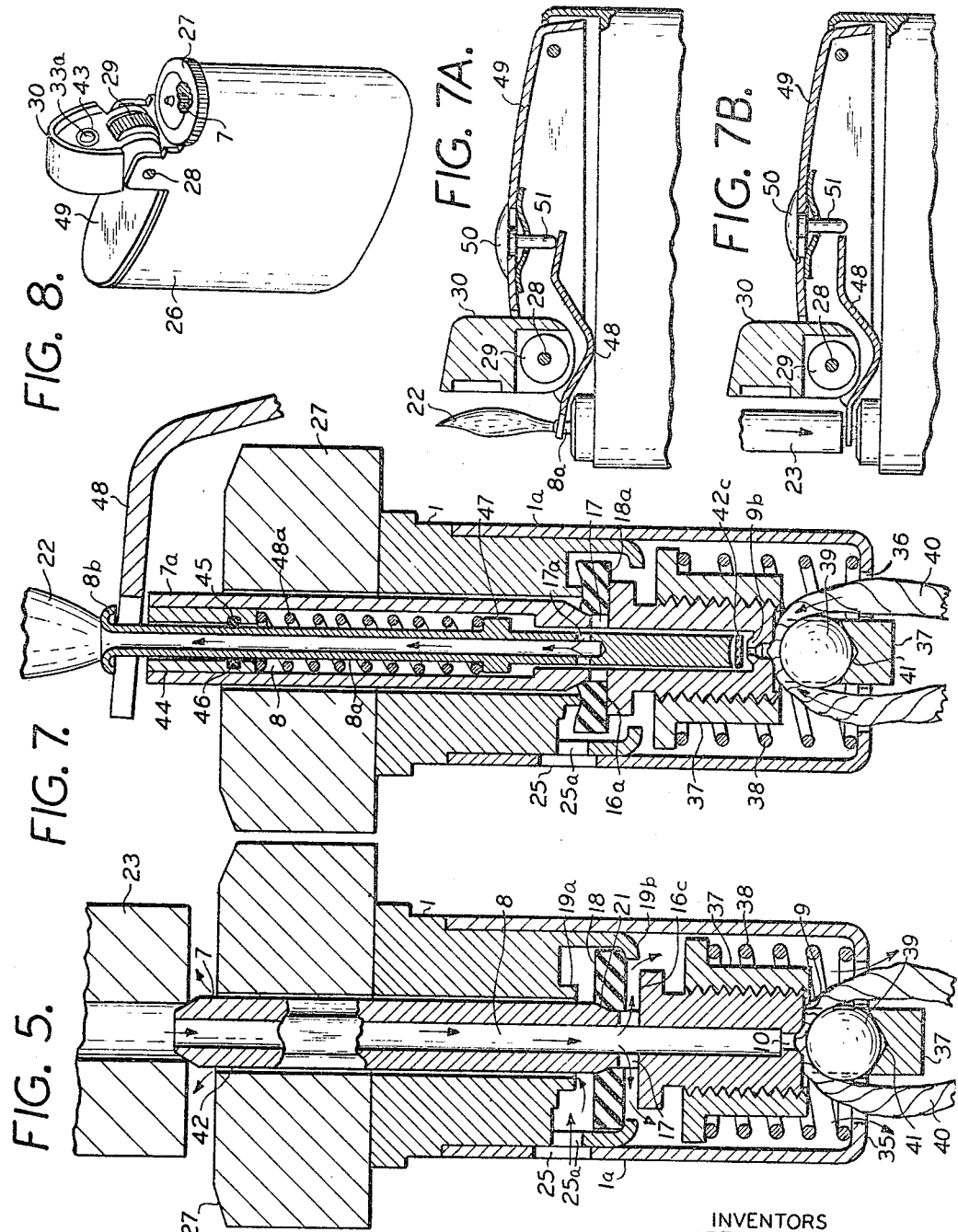

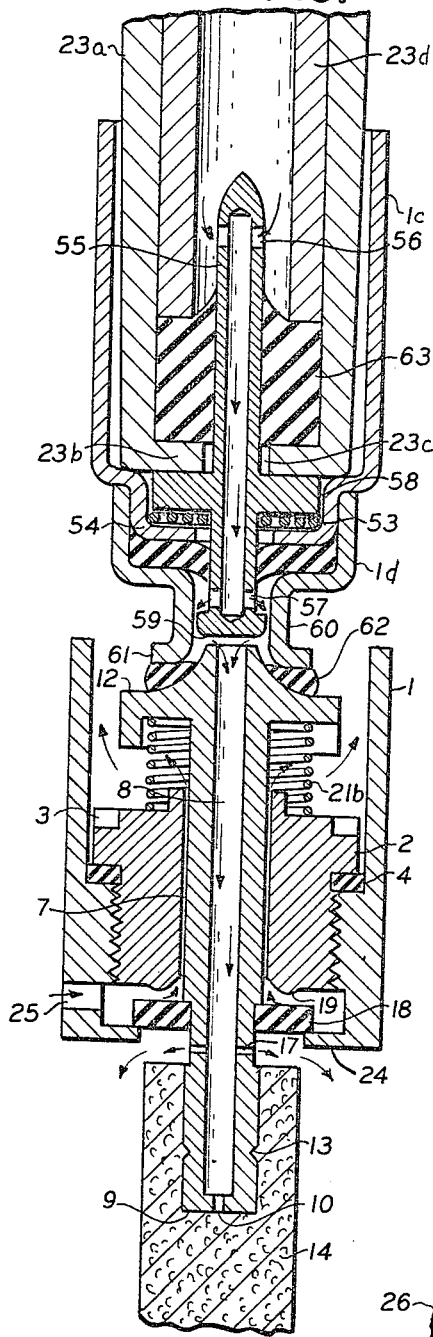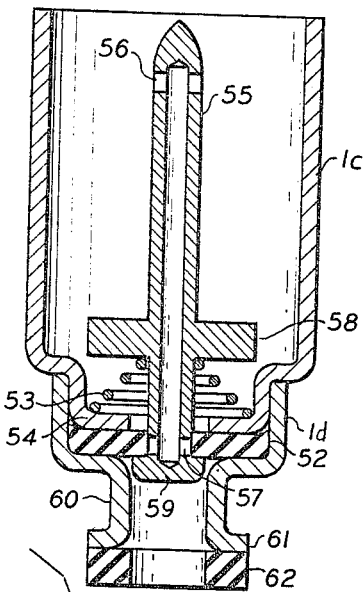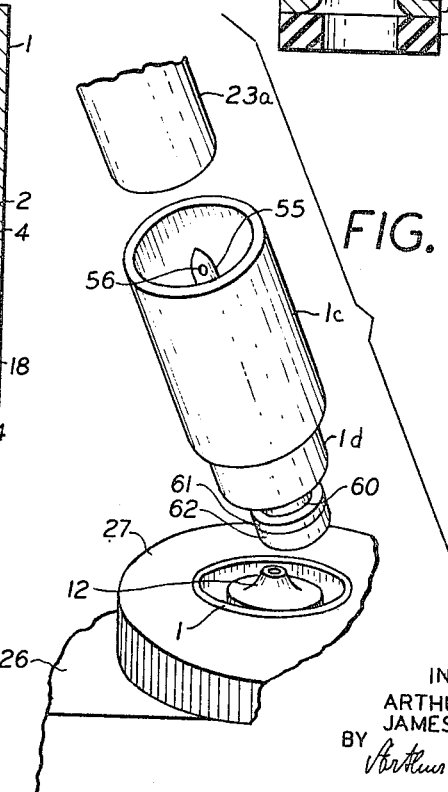

United States Patent Office 3,277,674
Patented Oct. 11, 1966

3,277,674
BURNER-INLET VALVE FOR GAS LIGHTERS
Arthur O. Klein, New York, and James D. Smith, Pittsford, N.Y., assignors to Ronson Corporation, Woodbridge, N.J., a corporation of New Jersey
Continuation of application Ser. No. 269,026, Mar. 29, 1963. This application Aug. 26, 1965, Ser. No. 486,265
13 Claims. (Cl. 67—7.1)

This is a continuation of application Serial No. 269,026, filed March 29, 1963, which was abandoned on October 4, 1965.

This invention relates to cigarette lighters and similar devices of the type which use liquefied gas a fuel, and more particularly to means that can alternatively function as burner valve means and inlet valve means.

Valves for admitting liquefied gas from a refill vessel having a connecting member to the reservoirs of gas lighters or the like are already known in the art. Such valve means comprise generally at least one outer or fixed member, one inner or movable member, and at least one sealing member.

Burner valves for gas lighters are also known in the art. Such burner valves generally comprise a fixed outer member, movable inner member, gas flow throttling means between the outer fixed and the movable inner member, and shut-off means which can be selectively operated to permit the controlled escape of gas through said burner valve.

Inlet valves of the aforedescribed type which are especially intended for filling the reservoir of a lighter using liquefied gas are described for example in U.S. Patents Nos. Re. 24,163 and 2,882,940.

Burner valves of the aforedescribed type which are utilized in liquefied gas lighters and are generally in communication with the reservoir of said lighters are described for example in U.S. Patent 2,620,643 and 2,561,-270 and French Patent No. 787,706 granted on July 8, 1935, and which issued in the name of M. Pingeot.

Furthermore, it should also be noted that in the past, attempts have been made to combine the inlet valve and burner valve of a liquefied gas lighter into one housing. Examples of such a construction can be found in the German published patent application No. 1,059,224. However, in the embodiment disclosed and described in the aforementioned published patent application the inlet valve is situated on the bottom wall of the casing or reservoir of a gas lighter and the burner valve is situated on the opposite top wall of the same casing or reservoir.

The prior art also describes combination burner and inlet valves having either a fixed or a flexible housing which is located on the top wall of the casing or reservoir of a gas lighter. This housing serves the dual function of a burner valve housing and an inlet valve housing. However, various prior art constructions have different inner movable valve members for the burner valve and inlet valve. These inner movable valve members had to be exchanged in order to adapt the valve as a whole to function as either a burner valve or an inlet valve. Illustrative of this prior art are the disclosures in French Patent No. 923,219, Quercia, February 17, 1947, and U.S. Patent No. 2,608,081.

All of the aforedescribed constructions have certain important disadvantages. For instance, a standard gas lighter known in the prior art has a burner valve which is generally mounted on the top plate of the casing of the gas lighter, and an inlet valve which is generally mounted on the bottom plate of the casing. Both the burner valve and inlet valve of a gas lighter have complicated parts which require precision manufacture and are, therefore, expensive to construct and assemble. Furthermore, since butane, propane and like liquefied gases are confined in the reservoir of a gas lighter under considerable pressure, the burner and inlet valves must be constructed and mounted in the reservoir of the gas lighter in such a manner so that there is no gas leakage of the pressurized, liquefied gas stored in the reservoir. It will be obvious to those persons skilled in the art that, since there are two separately mounted valves, the possibilities of leakage are approximately doubled. The aforedescribed disadvantage also exists in the embodiments described and illustrated in the German published patent application No. 1,059,224. Despite the fact that there is only one tubular valve housing extending through the entire lighter casing, this type of combination inlet-burner valve is also complicated because there are separate inner movable valve members for the inlet and burner valves. Here too, leakage may occur through two different sealing surfaces. Furthermore, since there are separate inner movable valve members, the difficulty and expense of manufacture and the possibilities of malfunctioning of this type of combination burner-inlet valve are not significantly reduced from those known constructions which have separate burner and inlet valves.

Lastly, the combination burner and inlet valves disclosed in French Patent No. 923,219, Quercia, February 17, 1947, and U.S. Patent No. 2,608,081 also have important disadvantages. The housing for both the inlet and burner valve is mounted generally on the top plate of the casing of the gas lighter. This housing has the dual function of providing alternatively a seat for the inner movable member of the burner valve and the inner movable member of the inlet valve. However, separate and distinct inner movable members for the burner and inlet valves are used in these types of combination valves, so that when the function of the valve is to be changed from burner valve to inlet valve, the inner movable member corresponding to one of the two functions must be removed and replaced by the inner movable member corresponding to the other of the functions. This obviously makes a very cumbersome gas lighter.

It is a principal object of this invention to provide a combination burner-inlet valve having only one housing and one inner movable member and which can perform satisfactorily both the functions of a burner valve and an inlet valve for a liquefied gas lighter.

It is a general object of this invention to provide a burner-inlet valve having a simplified and more economic construction than those combination burner and inlet valves of the aforedescribed character which are known in the art.

A burner-inlet valve according to our invention comprises a valve housing that is adapted to be mounted in a wall of the reservoir of a gas lighter. Generally, the reservoir of such a lighter is partially filled with pressurized gaseous fuel such as butane, propane or the like. An inner valve member is movably mounted within the valve housing and has an axial passage through which the fuel in gaseous form is released to a burner and through which liquefied gas may be passed into the reservoir of the gas lighter as it is refilled from time to time. This inner valve member is provided with at least one port which is positioned to place the passage in communication with the reservoir when the inner member is moved to a refill or inlet position, but is otherwise blocked when the inner member is in another position called the burner position. The inner member also has at least one port which is positioned in relation to the housing to place the passage in communication with the reservoir at least during the time when the inner member is in the burner position. Generally, the passage of fuel from the reservoir to the passage when the inner member is in the burner position is throttled by appropriate means.

The novel features which are characteristic of the invention are set forth in the appended claims.

Several illustrative embodiments of burner-inlet valves constructed in accordance with this invention, together with particular objects and advantages thereof, are described in the following specification and are illustrated in the accompanying drawings in which:

FIG. 1 is an elevation in cross section of one embodiment of this invention showing the burner-inlet valve in the burner-open position;

FIG. 2 is an elevation in cross section of the embodiment illustrated in FIG. 1 showing the connecting member of a refill vessel depressing the inner movable member of the burner-inlet valve so that the valve is in the inlet-open position;

FIG. 3, also an elevation in cross section, illustrates another embodiment of this invention similar to the embodiment shown in FIGS. 1 and 2 in which the inner movable member of the burner-inlet valve has been depressed by a connecting member of a refill vessel. This embodiment is distinguished from the embodiment illustrated in FIGS. 1 and 2 by the existence of an exhaust passage which is opened to vent the reservoir of the gas lighter during the filling operation;

FIG. 4 is an elevation in cross section of a third embodiment of this invention in which the burner-inlet valve includes means for adjusting the gas flow throttling device of the valve, said burner-inlet valve being shown in the burner-open position;

FIG. 4A is a bottom plan view along lines 4A of FIG. 4;

FIG. 4B is a sectional view along lines 4B of FIG. 4;

FIG. 5 is an elevation in cross section of the embodiment shown in FIG. 4 wherein the burner-inlet valve is in the inlet-open position;

FIG. 6 is an elevation in cross section of a fourth embodiment of this invention showing the burner-inlet valve in the inlet-open position, said burner valve also having means for adjusting the gas flow throttling device of the valve;

FIG. 7 is an elevation in cross section of a fifth embodiment of this invention showing a burner-inlet valve which also has means for adjusting the gas flow throttling device of the burner-inlet valve;

FIG. 7A is a partial elevation partly in cross section of a lighter incorporating the burner-inlet valve of FIG. 7 and showing the lighter in the burner-operating position and the valve in the burner-open position;

FIG. 7B is a partial elevation partly in cross section of the lighter of FIG. 7A and showing the valve of FIG. 7 in the inlet-open position so that the reservoir of the lighter may be filled through a connecting member from a refill vessel;

FIG. 8 is an illustration in perspective of a gas lighter which incorporates a burner-inlet valve according to this invention;

FIG. 9 is an elevation in cross section of an adaptor for connecting a refill vessel to a burner-inlet valve such as that shown in FIG. 3;

FIG. 10 is a sectional elevation showing the cooperative relations among the burner-inlet valve of FIG. 3, the adaptor of FIG. 9, and the neck of a refill vessel, the valve being in the inlet-open position;

FIG. 11 is an exploded view in perspective of the top portion of a gas lighter incorporating any of the burner-inlet valves illustrated in FIGS. 1 to 10 and an adaptor having a piercing member and the neck of a refill vessel, the figure demonstrating how to fill said gas lighter with liquefied pressurized gas.

Referring now to FIG. 1, there is illustrated a burner-inlet valve having an exterior housing 1 preferably of cylindrical shape that is screwed in a gas tight manner into or welded to a wall (not illustrated) of a reservoir, for example, the reservoir of a lighter fueled with liquefied gas. The housing 1 forms a receptacle for a valve seating portion 2 which is screwed into the housing 1 by means of a special key (not illustrated) that engages recesses 3 of the seating portion 2. A sealing washer 4 is positioned intermediate the housing 1 and the seating portion 2 to provide a gas tight seal between the aforementioned two parts. A central axial bore 5 extends through the seating portion 2, and an annular recess 6 is provided along a part of the inside wall of the bore 5. An inner movable valve member 7 having an axial bore 8 extends through the axial bore 5. The inner movable valve member 7 also has a bottom wall 9 with an axial through-hole 10. The inner movable valve member 7 has a small annular recess 11 opposite recess 6 in the seating portion 2. The inner movable member 7 has at its upper end a flange portion 12 and the seating portion 2 has at its top surface an annular collar 15 extending axially upward.

A filter element 14, made of any suitable porous material such as sintered metal, plastic or ceramic, surrounds the bottom end of the inner movable member 7 and is secured thereto by engagement with an annular recess 13.

The inner valve member 7 also has another annular recess 21 having upper and lower shoulders respectively designated as 16a and 16b. Through-holes 17 extend transversely through the inner valve member 7 within the recess 21. An annular sealing member 18, the thickness of which is less than the length of the recess 21, is movably seated in the recess 21 and serves to seal the through-holes 17 when the valve is in the burner-open position shown in FIG. 1. As shown in FIG. 1, we provide an annular seat 19 on the bottom wall of the seating portion 2 which cooperates with the sealing member 18 to form a valve. A sealing ring 20 is located in the recess 11 and serves to prevent any escape of gas which may pass around the sealing member 18 during the filling operation as illustrated in FIG. 2. A partly compressed coil spring 21b or other biasing means is positioned between the top wall of the seating portion 2 and the undersurface of the flange 12. When the valve is in the burner-open position, this coil spring 21b urges the inner movable valve member 7 in an upward direction so that the shoulder 16b urges the sealing member 18 against the annular seat 19; thus upward movement of the inner movable valve member 7 is consequently limited by the respective engagements of shoulder 16b, sealing member 18, and annular seat 19.

In FIG. 1 of the drawing one of the embodiments of the burner-inlet valve forming part of this invention is illustrated in the burner-open position. In this position of the valve pressurized liquefied gas stored in the reservoir of the gas lighter may pass through the filter element 14, the through-hole 10, the axial bore 8, and then emerge in gaseous form from the burner opening where the gas forms a flame 22 when ignited.

In FIG. 2 of the drawing the burner-inlet valve of FIG. 1 is illustrated in the inlet-open position in which pressurized liquefied gas from a refill vessel (not illustrated) may pass through a connecting neck portion 23, the axial bore 8, and the through-holes 17 into the reservoir of a gas lighter or the like. In both FIGS. 1 and 2 the direction and course of the gas flow is illustrated by means of small arrows. In FIG. 2 it will be noted that the neck 23 of the refill vessel is placed over the burner opening so that it abuts against the flange 12 of the inner movable member. By applying pressure against the flange 12 by means of the neck portion 23 the inner movable member is moved axially downward against the action of the coil spring 21b. The sealing ring 20, which is seated in the annular recess 11, moves together with the inner movable member 7, and the sealing member 18 mounted in recess 21 will also be carried downward until its outer periphery engages the lower wall 24 of the housing 1, whereupon further downward movement of the inner member 7 will cause the sealing member 18 to slide toward the top of recess 21 and to uncover the through-holes 17. As soon as this occurs, the liquefied gas can flow from the refill vessel into the reservoir of the gas lighter. The downward movement of the inner movable valve member 7 is limited by the action of the spring 21b and also by the respective engagements of the shoulder 16a and the sealing member 18. As will be noted, after a certain downward movement of the inner movable member the shoulder 16a engages with the inner portion of the sealing member 18 whereas the outer portion of the sealing member 18 abuts against the bottom wall 24 of the housing 1.

It will be obvious to one skilled in the art that unless the pressure within the reservoir of the gas lighter is lower than the pressure in the refill vessel no gas will pass from the refill vessel into the reservoir of the gas lighter in the embodiment illustrated in FIGS. 1 and 2. There are several means known in the art for inducing necessary pressure differential. However, we have devised an advantageous modification of the embodiment shown in FIGS. 1 and 2 which positively relieves the pressure in the reservoir. Burner-inlet valves having this as well as other modifications to be described below are illustrated in FIGS. 3, 4, 5, 6, 7 and 10 and are to be considered as a part of this invention. All of these embodiments illustrate burner-inlet valves which have a vent to put the reservoir of the gas lighter into communication with the atmosphere during the filling operation. The embodiment of FIG. 3 is substantially identical to that illustrated in FIGS. 1 and 2 except that a vent is provided that will place the reservoir of the gas lighter into communication with the atmosphere during the filling operation. It can be noted that in this embodiment the sealing ring 20 with the accompanying annular recesses 6 and 11 are omitted. Therefore, when the inner movable member 7 is moved axially downward by the neck 23 of a refill vessel the latter is put into communication with the reservoir of the gas lighter via the axial bore 8 and the through-holes 17. Almost simultaneously therewith, gas from the reservoir of the lighter may escape through hole 25 and the space between the outer walls of the inner movable member 7 and the inner walls of the axial bore 5 of the seating portions 2. By putting the reservoir of the gas lighter into communication with the atmosphere during the filling operation, the pressure inside the reservoir becomes automatically lower than that in the refill vessel so that the pressure in the refill vessel will cause the pressurized liquefied gas to flow from the refill vessel into the reservoir.

Furthermore, it will also be evident to those skilled in the art that the level of pressurized liquefied gas in the reservoir will not rise above the level of the hole 25. Any additional fuel that is transferred into the reservoir through the inlet valve will escape in the form of a fine mist after the pressurized liquefied gas inside the reservoir has risen to the level of the hole 25. For this purpose, the last mentioned hole 25 has a cross sectional area larger than the combined cross sectional area of through-holes 17.

Referring now to FIG. 4 of the drawings, there is illustrated a third embodiment of an inlet-burner valve together with the associated snuffer mechanism of a gas lighter. In two upwardly projecting walls 34 of the lighter casing 26 there is mounted the usual snuffer mechanism having an axle 28 on which is rotatably mounted a spark wheel 29 and a snuffer cap 30. Within the frame of the snuffer cap 30 there is situated a spring 31, a rubber sealing disc 32 and a retaining ring 33. Upon release of the actuating mechanism (not shown) of the gas lighter the snuffer will be urged by a biasing means (not shown) to rotate approximately 90 degrees towards the adjacently mounted burner-inlet valve and the rubber disc 32 of the snuffer 30 will come to rest on top of the burner-opening of the inner movable member 7, thereby extinguishing the flame and shutting off any further gas flow.

Similar to the embodiments illustrated in FIGS. 1–3, the inner movable member 7 in FIG. 4 has the axial bore 8, the bottom wall 9, and the through-hole 10. It can also be noted that the embodiment of FIG. 4 has a slightly different housing 1 which is welded to the walls 26 of the lighter casing and that a sub-housing 1a is press fitted over the housing 1. The bottom wall 35 of the sub-housing 1a has one cross-shaped hole 36 as shown in FIG. 4a. In addition thereto, there is on the side of the cylindrical walls of the sub-housing 1a a cross hole 25 for venting the interior of the gas lighter reservoir. The housing 1 is provided with an annular seat 19a and an inturned annular end portion 19b. In addition, the housing 1 has a hole 25a which is co-axial with hole 25. The inner movable member 7 is provided with an annular platform 16c which forms the lower shoulder of an annular recess 21a. As in the embodiments illustrated in FIGS. 1 to 3, through-holes 17 extend transversely through the inner valve member 7 within the recess 21a and an annular sealing member 18 is movably seated in the recess 21a and serves to seal the through-holes 17 when the inner member 7 is in the burner-open position. The inner movable member 7 has a lower threaded portion 7a on which is mounted a threaded valve member 37. A compression spring 38 is situated between member 37 and the bottom wall 35 of the sub-housing 1a and urges the valve member 37 jointly with the inner valve member 7 and the sealing member 18 in an upward direction. In this manner, the annular platform 16c urges the sealing member 18 against the annular seat 19a. The upward movement of the inner movable valve member 7 is consequently limited by the respective engagement of platform 16c, sealing member 18, and the annular seat 19a.

The valve member 37 is illustrated in more detail in FIGS. 4a and 4b. As can be noted from FIG. 4b an axial bore 38d extends into the valve member 37 and a portion 38a of this axial bore is threaded and is adapted to receive the lower threaded end of the inner movable valve member 7. Below the threaded portion 38a of the bore 38d there is a non-threaded portion which is adapted to receive a metal or plastic ball 39 and the wick of cotton-like material which form part of the gas throttling means of the burner-inlet valve. The construction and the functioning of the throttling means will be explained below. Two symmetrical recesses 38b are provided on each side of the valve member 37 so that a transverse through-hole 38c is formed at the lower end of the axial bore 38d. The ball 39 is thus nestled in a cradle 41 formed by two inclined surfaces at the bottom of the bore 38d and the wick 40 is situated between the upper surface of the ball 41 and the lower end of the inner movable valve member 7 and extends transversely and below the member 7. Due to the two symmetrical recesses in valve member 37 the same is T-shaped. The lower end of the T of valve member 37 is adapted to move through the hole 36 of the sub-housing 1a and the wick 40 extends through the same hole 36 into the reservoir of the gas lighter.

An adjusting wheel 27 having a knurled peripheral surface is mounted so that it rests on the top wall 26 of the gas lighter and is slidable axially along the upper portion of the inner movable valve member 7. This may be done by making the upper portion of the inner movable valve member 7 hexagonal and also making the axial bore 42 of the adjusting wheel 27 hexagonal so that the wheel loosely engages the hexagonal portion of the member 7. Thus, when the adjusting wheel 27 is manually rotated, the inner movable valve member 7 will rotate with it, but member 37 will not rotate because of engagement of the lower portion of the T-shape in the hole 36. This permits the part 7a to be screwed in or out of the threaded bore of the member 37 to adjust the pressure exerted on the wick 40. This wick dips into the liquefied gas in the reservoir and conducts it to the valve through-hole 10 by capillarity. By varying the pressure exerted on the wick by the bottom wall 9 the capillarity of the wick may be varied, thus controlling the flow of gas to the valve.

In FIG. 4 of the drawing, the burner-inlet valve is illustrated in the burner-open position in which the sealing member 18 seals the through-holes 17. FIG. 5 of the drawing illustrates the same burner-inlet valve on an enlarged scale in the inlet-open position. In both drawings, the direction and course of flow of the gas is indicated by small arrows.

In FIG. 5 the neck 23 of a refill vessel abuts the upper end of the inner movable valve member 7 to press the member 7 in a downward direction so that the crossholes 17 pass the sealing member 18 substantially as described in connection with FIG. 2. In this manner, communication is established between the refill vessel and the interior of the lighter reservoir. As can be noted, the sealing member 18 is movably seated in the annular recess 21 in a manner which is similar to the corresponding structure of FIGS. 1 to 3. In the burner-open position shown in FIG. 4, the sealing member 18 is wedged against the annular seat 19a by the annular platform 16c and covers the cross-holes 17. In this manner, both the exhaust passage, through the holes 25, 25a and along the space between the outer periphery of the inner movable valve member 7 and the axial bore 5 of the valve housing 1, as well as the inlet passage through the holes 17, are sealed. In FIG. 5 both the aforementioned passages have been open due to the downward movement of the inner movable valve member 7 through the sealing member 18. This opens almost simultaneously both the filling and venting passages to the reservoir of the gas lighter.

In FIG. 6 there is illustrated a fourth embodiment forming part of this invention. This embodiment is practically identical to the embodiment of FIGS. 4 to 5 with the exception of the shut-off mechanism of the burner valve. The burner-inlet valve is also here illustrated in the inlet-open position. The shut-off mechanism of FIG. 6 comprises a shut-off stem 42 which extends axially through the bore 8 of the inner movable valve member 7 down to the through-hole 10 thereof. An annular seating portion 9a is provided at the bottom of the inner movable valve member 7. The lower end of the shut-off stem 42 is provided with a T-shaped metal portion 42a to which is secured a rubber shut-off disc 42b.

Unless pressure is applied to the upper end of the shut-off stem 42, gas evaporating from the wick 40 through the through-hole 10 will pass through the inner axial bore 8 of the member 7. In order to shut off the burner valve, we provide a snuffer cap 30 similar to the snuffer cap used in the embodiments shown in FIGS. 4 and 5. Within the frame of the snuffer cap 30 there is a spring 31a which urges a metal or the like ball 43 against the retaining washer 33a. As can be noted, the ball 43 protrudes slightly through the central hole of the washer 33a. Upon release of the actuating mechanism (not shown) of the gas lighter, the snuffer cap 30 will be urged by a biasing means (not shown) to rotate approximately 90 degrees towards the adjacent burner-inlet valve. The protruding surface of the ball 43 will thereupon resiliently strike the top portion of the shut-off stem 42 and thereby urge the rubber shut-off disc 42b via the T-shaped portion 42a against the annular seat 9a. In this manner, the gas flow into the burner valve portion of the burner inlet valve is shut off. It will be obvious to those skilled in the art that the snuffer springs 31 and 31a must have spring forces smaller than the corresponding spring forces of spring 38 so that the inner movable valve member 7 is not pushed downwardly by the snuffer to unseal the through-holes 17. In FIG. 7 there is illustrated a fifth embodiment of the burner-inlet valve. Here the valve is shown in the burner-open position. This embodiment is very similar to those illustrated in FIGS. 4 to 6. The main difference consists in the shut-off mechanism of the burner valve. In this embodiment, the inner movable valve member 7a is adapted to telescopically receive a burner tube 8a. At the upper end of the inner movable valve member 7a there is press fitted into the bore 8 a cylindrical member 44 which is provided with an internal annular recess 45 having a sealing ring 46 seated thereon. The burner tube 8a is provided with an external annular shoulder 47. A spring 48a is mounted between the bottom end of the member 44 and the top of the shoulder 47 to bias the bottom end of the burner tube 8a downwardly against a seat 9b formed at the bottom of the inner movable valve member 7a. The shape of the shut-off disc 42c and the corresponding lower end of the inner movable valve member 7a and the annular seat 9b form part of the construction described and claimed in U.S. Patent No. 3,123,992. The application Serial No. 32,437 for that patent was filed by J. Donald Smith, the co-inventor of the instant application, and another. Application Serial No. 32,437 was co-pending with application Serial No. 269,026, the parent of the instant application.

Through-holes 17a are provided in the burner tube 8a and these are adapted to register with the through-holes 17 of the inner movable valve member 7a when the burner-inlet valve is in the inlet-open position. As can be noted, the burner tube 8a is adapted to move axially inside the inner movable valve member 7a so as to selectively close or open the through-hole 10. The movement of the burner tube 8a is controlled by a fork lift mechanism 48 which is further illustrated in FIGS. 7a and 7b. FIG. 7a illustrates a gas lighter having a burner-inlet valve according to this invention and in which the valve is shown in the burner-open position. As can be noted, a fingerpiece 49 is pivotably mounted on the top of the gas lighter. A member 50 is slidably mounted in the top wall of the fingerpiece and has a downwardly extending projection 51. When the fingerpiece is depressed the projection 51, which is shown in FIG. 7a in its operative position, is adapted to bear down on the fork lift 48 and thereby lift the tube 8a from the seat 9b of the inner movable valve member 7a.

In FIG. 7b the same gas lighter is shown in the inlet-open position. Here the slidable member 50 has been moved transversely to its inoperative position so that projection 51 no longer rests on top of the fork lift mechanism 48. Consequently, the lower end of the burner tube 8a has been returned to the shut-off position due to the action of the spring 48a. Now the neck 23 of a refill vessel may bear down on rim 8b around the mouth of the burner tube 8a and move downwardly the burner tube and the entire inner movable valve member, thereby removing the sealing member 18a from its position over the through-holes 17. Pressurized liquefied gas may, therefore, flow from the refill vessel into the reservoir of the gas lighter via the tube 8a, the through-holes 17a, 17 and the hole 36 on the bottom of the sub-housing 1a. The sealing ring 46 prevents the escape of gas between the outer periphery of the burner tube 8a and the walls of the bore 8 of the inner movable valve member 7a. Similarly, when the burner-inlet valve is in the burner-open position, no gas can escape through the aforedefined passage.

FIG. 8 is an illustration in perspective of a gas lighter having a burner valve of the type illustrated in FIG. 6. As can be noted, the fingerpiece 49 has been depressed so that the snuffer 30 has been lifted from the top portion of the inner movable valve member 7.

All of the aforementioned embodiments are adapted to function with one type of refill vessel which is generally known in the art as the "aerosol" type. The neck of this type of refill vessel is adapted to move reciprocally in its seat to selectively open and close the outlet passage of the refill vessel. There exists, however, a second type of refill vessel in which the neck is fixedly mounted in the refill vessel. At the forward end of the neck of the second type of refill vessel there is mounted a pierceable, self-sealing closure disc which is adapted to be pierced by an inlet needle of a typical inlet valve well known in the art.

The various embodiments of the burner inlet valve illustrated in FIGS. 1 to 8 of this invention may be modified to be filled by a refill vessel of the second type defined above by means of an adaptor which may be packaged and sold with the gas lighter or with the refill vessel. Such an adaptor is illusrtated in FIGS. 9 to 11 of the drawing. As will be noted, the adaptor comprises an upper cylindrical housing 1c which has an inside diameter suitable to receive the neck of the refill vessel of the second type. The upper housing 1c is seated in a lower cylindrical housing 1d. An annular sealing ring 52 is wedged between the bottom wall of upper housing 1c and the internal shoulder of lower housing 1d. A coiled compression spring 53 is securely mounted in the bottom portion 54 of the upper housing 1c. A hollow piercing needle 55 has a portion which extends through the coil spring 53, through a central hole in the bottom wall of the upper housing and through a central hole in the sealing ring 52. The piercing needle 55 has upper through-holes 56 and lower through-holes 57 which connect the hollow interior of the needle to the outside. An upper annular projection 58 is provided on the needle 55 below through-holes 56 and a lower annular projection 59 as provided below the through-holes 57. The coil spring 53 is mounted between the bottom portion 54 of the housing 1c and the underside of the annular projection 58 of the piercing needle 55. The spring 53 urges the piercing needle in an upward direction. As will be noted, the upward movement of the piercing needle is limited by the engagement of the lower projection 59 with the sealing ring 52. In the uppermost position of the needle the sealing ring 52 seals through-holes 57.

The upper projection 58 provides a seat for the front end of a refill vessel of the second type referred to above. When the self-sealing disc of a refill vessel is pierced by the needle 55 and the needle is fully inserted in the neck 23a, the end of the neck comes to rest on the upper surface of the annular projection 58 and then pushes the piercing needle 55 downward against the action of the spring 53. The annular projection 58 is adapted to move in and out of the bottom portion 54 of the housing 1c and the lower annular projection 59 is adapted to move inside a narrowed neck portion 60 of the lower housing 1d. The neck portion 60 includes an outwardly flaring flange portion 61. Preferably, a resilient washer 62 is secured by any suitable means to the outwardly flaring flange 61. It should be noted, however, that the adaptor will also function without such a washer.

In FIG. 10 of the drawing there is also illustrated a burner-inlet valve of the type shown in FIG. 3. This burner-inlet valve is shown in the inlet-open position. A refill vessel of the second type described above is shown mounted on top of the flange 12 together with an adaptor of the type illustrated in FIG. 9. As will be noted, the neck of the refill vessel 23a has a self-sealing puncturable membrane 63 which is shown mounted at the outer end of the neck 23a. The neck 23a is provided with a forward plate 23b which has a central hole 23c adapted to receive the piercing needle 55. A fixed inner sleeve 23d bears against the other side of the sealing membrane 63 and thereby holds the sealing membrane in place. The sleeve 23d is either press fitted inside the neck 23a or is glued or welded to the inner walls thereof so that it remains fixed in its position. In FIG. 10 the adaptor, piercing needle 55, and spring 53 are shown in their lowermost position in which the needle 55 has fully pierced the sealing membrane 63 and in which the neck 23a has fully depressed the spring 53. In this position, it will be noted that the washer 62 acts as a seal so that no gas flowing from the refill vessel can escape to the surrounding atmosphere except through the exhaust hole 25. However, a satisfactory seal can also be formed by the mere abutting contact of flanges 61 and 12. As in the previous figures, the direction and course of the liquefied gas is shown by small arrows.

In FIG. 11 a gas lighter refill vessel and adaptor are illustrated in perspective to show the manner in which the adaptor may be placed over the neck of the refill vessel and in which the refill vessel and adaptor are placed on the top flange 12 of a burner-inlet valve so that the gas lighter may be refilled by means of the refill vessel. The burner-inlet valve illustrated in FIG. 11 is of the type illustrated in FIGS. 3 and 10 but also includes gas flow adjusting means (note the knurled wheel 27) of the type illustrated in FIGS. 4–7.

The sealing members and sealing rings illustrated in the figures may be formed of a suitable resilient sheet material, for example, rubber, synthetic rubber or other suitable elastomer. The other parts of the burner-inlet valve may be formed of a suitable metal or plastic having the required physical and chemical properties such as a certain degree of rigidity, substantial chemical inertness to the pressurized liquefied gas, workability, etc. It has been found that brass and certain plastics such as Delrin, are well suited for this purpose.

Although the present invention has been described in conjunction with preferred embodiments, it is to be understood that modifications and variations may be resorted to without departing from the spirit and scope of the invention, as those skilled in the art will readily understand. The invention is defined in the following claims.

We claim:

1. A burner-inlet valve for a pyrophoric gas lighter or the like which valve comprises in combination a valve housing adapted to be mounted in an air tight manner in the wall of the reservoir of a gas lighter, an inner movable valve member reciprocally mounted in said valve housing for movement between inlet open and inlet closed positions, said inner valve member having a bore extending at least partially therethrough and communicating with the reservoir via an inlet and outlet fuel flow passage means through which liquified fuel under pressure may be charged into the lighter reservoir when the valve functions as an inlet valve and an outlet passage means through which gaseous fuel may be released from the lighter reservoir when the valve functions as a burner valve, gas flow throttling means constructed and arranged to control the flow of gaseous fuel through said outlet passage means, and sealing means constructed and arranged to seal said inlet passage means when said inner valve member is in the inlet closed position.

2. A burner inlet valve for a pyrophoric gas lighter or the like which valve comprises in combination a valve housing adapted to be mounted in an air-tight manner in the wall of the reservoir of a gas lighter, an inner movable valve member reciprocally mounted in said valve housing for movement between inlet open and inlet closed positions, said inner valve member having inlet and outlet fuel flow passage means through which liquified fuel under pressure may be charged into a lighter reservoir when the valve functions as an inlet valve and through which gaseous fuel may be released from a lighter reservoir when the valve functions as a burner valve, gas flow throttling means constructed and arranged to control the flow of gaseous fuel through said outlet passage means, sealing means constructed and arranged to seal said inlet passage means when said inner valve member is in the inlet closed position and said valve housing and inner valve member being constructed and arranged to provide vent passage means therebetween when said inner valve member is in the inlet open position to afford communication from a lighter reservoir to the exterior of a lighter during charging of liquified fuel through said inlet passage means.

3. A burner-inlet valve for a gas lighter having a reservoir for containing gaseous fuel in liquid form under pressure which valve affords controlled release of fuel in gaseous form from the reservoir when the valve functions as a burner valve and, alternatively, affords charging of the reservoir with fuel in liquid form under pressure when the valve functions as an inlet valve, said burner-inlet valve comprising an outer valve member adapted to be mounted in an outer wall of a lighter casing, an inner valve member mounted to move in said outer valve member between open and closed positions as hereinafter set forth, said inner member having a bore extending at least partially therethrough and communicating with the reservoir via inlet fuel flow passage means through which liquified fuel under pressure may be charged into the lighter reservoir when the valve functions as an inlet valve and an outlet passage means through which gaseous fuel may be released from the lighter reservoir when the valve functions as a burner valve, said outlet means positioned on said inner member to be within the lighter casing in which the valve may be mounted, burner gas flow throttling means constructed and arranged to control flow of fuel into said fuel passage from said outlet means, and sealing means constructed and arranged to seal said inlet passage means when said inner valve member is in the aforesaid closed position and to unseal said inlet passage when said inner valve member is in the aforesaid open position.

4. In a gas lighter or the like constructed to be charged with liquified gaseous fuel under pressure and including in combination, a casing having therein a fuel reservoir, and burner-inlet valve means carried by said casing, said burner inlet valve means including an outer valve member fixed with respect to said casing and having therein a bore, an inner valve member mounted to move in said bore between open and closed positions as hereinafter set forth, said inner movable valve member having a bore extending at least partially therethrough and communicating with the reservoir via inlet fuel flow passage means through which liquified fuel under pressure may be charged into the lighter reservoir when the valve functions as an inlet valve and an outlet passage means through which gaseous fuel may be released from the lighter reservoir when the valve functions as a burner valve, burner gas flow throttling means operatively connected to said inner movable valve member to control flow of gaseous fuel through said outlet passage means, and sealing means operatively connected to said inner movable valve member to seal said inlet passage means when said inner movable valve member is in the aforesaid closed position and to unseal said inlet passage when said inner movable valve member is in the aforesaid open position.

5. A burner-inlet valve according to claim 4 and which further comprises biasing means acting between said outer and inner members to urge said inner valve member into closed position.

6. In a gas lighter constructed to be charged with liquified gaseous fuel under pressure and including in combination, a casing having therein a fuel reservoir, and burner-inlet valve means carried by said casing and affording controlled release of gaseous fuel from the reservoir when the burner-inlet valve means functions as a burner valve and, alternatively, the charging of the reservoir with liquified fuel under pressure when the burner-inlet valve means functions as an inlet valve, said burner inlet valve means including an outer valve member fixed with respect to said casing, an inner valve member mounted to move in said outer valve member between open and closed positions as hereinafter set forth, said inner movable valve member having a fuel passage through which the aforesaid release of gaseous fuel and charging of liquified fuel under pressure takes place, said inner member also having an inlet passage in communication with said fuel charging passage through which the inlet flow of liquified fuel under pressure flows into said reservoir, said outer and inner valve members being constructed and arranged to provide a vent passage therebetween thereby providing communication between said fuel reservoir and the atmosphere during charging of said fuel reservoir when said inner movable member is in said open position, gas flow throttling means on said inner movable member to control the release of gaseous fuel through said fuel passage, and sealing means operatively connected to said inner movable valve member to seal said inlet passage and vent passage when said inner movable valve member is in the aforesaid closed position and to unseal said inlet passage and vent passage when said inner movable valve member is in the aforesaid open position.

7. In a gas lighter constructed to be charged with liquified gaseous fuel under pressure and including in combination, a casing having therein a fuel reservoir, and burner-inlet valve means carried by said casing and affording controlled release of gaseous fuel from the reservoir when the burner-inlet valve means functions as a burner valve and, alternatively, the charging of the reservoir with liquified fuel under pressure when the burner-inlet valve means functions as an inlet valve, said burner-inlet valve means including an outer valve member fixed with respect to said casing, an inner valve member mounted to move in said outer valve member between open and closed positions as hereinafter set forth, said inner movable valve member having a fuel passage through which the aforesaid release of gas and charging of liquified fuel under pressure takes place, and also having an inlet passage in communication with said fuel charging passage through which the inlet flow of liquified gas fuel under pressure flows into said reservoir, gas flow throttling means on said inner movable valve member, to control the release of gaseous fuel through said fuel passage, and adjusting means operatively connected to said throttling means to adjust the release of gas through said fuel passage.

8. A burner-inlet valve according to claim 1 and which further comprises a pyrophoric gas lighter actuating mechanism mounted adjacent to said burner-inlet valve, said actuating mechanism including a snuffer cap which is pivotably mounted to move between a position in which it overlies said inner movable valve member and another position in which said inlet and outlet passage means are uncovered, and biasing means urging said snuffer cap into said valve overlying position to thereby stop the release of gaseous fuel through said passage means.

9. In a pyrophoric gas lighter or the like that is adapted to be charged with liquified fuel under pressure, a burner-inlet valve comprising in combination, a valve housing mounted in an air tight manner on a wall of the reservoir of said gas lighter, an inner movable valve member reciprocally mounted in said valve housing and adapted to move between open and closed positions as hereinafter set forth, said inner movable valve member being provided with an axial bore extending at least partially therethrough and also being provided with inlet and outlet passage means in communication with said axial bore, a filter element adapted to throttle gas flow therethrough and being operatively connected to the lower end of said inner movable valve member and said filter element having passages through which a lighter fuel reservoir is in communication with said outlet passage means, sealing means operatively mounted in relation to said inner movable valve member for sealing said inlet passage means, biasing means constructed and arranged to act between said valve housing and said inner movable valve member, said biasing means urging said inner movable valve member into said closed position, whereby said sealing means unseals said inlet passage means when said inner movable valve member is in said open position and seals said inlet passage means when said inner movable valve member is in said closed position.

10. A burner-inlet valve according to claim 9 and which further comprises second sealing means operatively mounted between the outer periphery of said inner movable valve member and the inner periphery of said valve housing to seal any communication between the reservoir of said gas lighter and the atmosphere during the charging of said reservoir with liquified fuel under pressure when said inner movable valve member is in said open position.

11. In a pyrophoric gas lighter or the like that is adapted to be charged with liquified gas under pressure, a burner-inlet valve comprising in combination, a valve housing having a vent opening and being adapted to be mounted in an air-tight manner on a wall of the reservoir of a gas lighter, an inner movable valve member reciprocally mounted in said valve housing and adapted to move between open and closed positions as hereinafter set forth, said inner movable valve member being provided with an axial bore extending at least partially therethrough and also being provided with inlet and outlet passage means in communication with said axial bore, a filter element adapted to throttle gas flow therethrough and being operatively connected to the lower end of said inner movable valve member, said filter element having passages through which a lighter fuel reservoir is in communication with said outlet passage means, sealing means operatively mounted in relation to said inner movable valve member for sealing said inlet passage means, biasing means mounted between said valve housing and said inner movable valve member, said biasing means urging said inner movable valve member into said closed position, said valve housing and inner valve member being constructed and arranged to provide a vent passage therebetween thereby providing communication between a fuel reservoir of a gas lighter and the atmosphere during charging of said reservoir when said inner movable valve member is in said open position, whereby said sealing means unseals said inlet passage means when said inner movable valve member is in said open position and seals said inlet passage means when said inner movable valve member is in said closed position.

12. The combination of a gas lighter or the like having a fuel reservoir to be charged with liquified fuel under pressure and a refill vessel having a neck portion with a pierceable membrane, said gas lighter including a burner-inlet valve comprising, in combination, a valve housing mounted in an air tight manner on a wall of the reservoir of said gas lighter, an inner movable valve member reciprocally mounted in said valve housing and adapted to move between open and closed positions as hereinafter set forth, said inner movable valve member being provided with a bore extending at least partially therethrough and also being provided with inlet and outlet passage means communicating between said axial bore and said reservoir, fuel flow throttling means constructed and arranged to control the flow of gaseous fuel from said reservoir into said bore through said outlet passage means, sealing means operatively mounted in relation to said inner movable valve member for sealing said inlet passage means when said inner valve member is in the closed position, biasing means acting between said valve housing and said inner valve member to urge said inner movable valve member into said closed position, and a refill vessel adapter constructed and arranged to sealingly connect said vessel to said inner movable valve member, said adapter comprising a piercing member, having a bore therethrough, for piercing said pierceable membrane of said refill vessel, and a connecting conduit portion adapted to fit over said inner valve member thereby placing said refill vessel via said hollow piercing member in communication with the interior of said gas lighter via said bore of said inner valve member.

13. A burner-inlet valve for a pyrophoric gas lighter or the like which valve comprises in combination a valve housing adapted to be mounted in an air tight manner in the wall of the reservoir of a gas lighter, an inner movable valve member reciprocally mounted in said valve housing for movement between inlet open and inlet closed positions, said inner valve member having inlet and outlet fuel flow passage means through which liquified fuel under pressure may be charged into a lighter reservoir when the valve functions as an inlet valve and through which gaseous fuel may be released from a lighter reservoir when the valve functions as a burner valve, gas flow throttling means constructed and arranged to control the flow of gaseous fuel through said outlet passage means, sealing means constructed and arranged to seal said inlet passage means when said inner valve member is in the inlet closed position, lighter actuating mechanism mounted adjacent to said burner-inlet valve, said actuating mechanism including a snuffer cap which is pivotably mounted to move between a position in which it overlies said inner movable valve member and another position in which said inlet and outlet passage means are uncovered, biasing means urging said snuffer cap into said valve overlying position to thereby stop the release of gaseous fuel through said passage means, and a shut-off stem loosely and slidably positioned in said fuel passage, a portion of said stem protruding outwardly from said inner valve member into interfering relation with said snuffer cap when the latter is in overlying position, said interfering relation urging said stem into said fuel passage to obstruct the passage and thereby stop the release of gaseous fuel therethrough.

References Cited by the Examiner
UNITED STATES PATENTS

| | | | |
|---|---|---|---|
| Re. 24,163 | 6/1956 | Zellweger | 141—330 |
| 2,620,643 | 12/1952 | Nissen | 67—7.1 |
| 2,708,347 | 5/1955 | Cameron. | |
| 2,720,098 | 10/1955 | Wagner | 67—7.1 |
| 2,731,298 | 1/1956 | Green | 141—20 X |
| 2,882,940 | 4/1959 | Zellweger | 141—293 |
| 3,123,992 | 3/1964 | Smith et al. | 67—7.1 |
| 3,150,508 | 9/1964 | Smith | 67—7.1 |

FREDERICK L. MATTESON, JR., *Primary Examiner.*

ROBERT A. DUA, *Examiner.*